(12) United States Patent
Stephan

(10) Patent No.: US 9,476,602 B2
(45) Date of Patent: Oct. 25, 2016

(54) COOLING SYSTEM FOR A BUILDING WITH LOW ENERGY CONSUMPTION

(71) Applicant: Commissariat a l'energie atomique et aux ene alt, Paris (FR)

(72) Inventor: Louis Stephan, Chambery (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 159 days.

(21) Appl. No.: 14/372,485

(22) PCT Filed: Jan. 15, 2013

(86) PCT No.: PCT/EP2013/050674
§ 371 (c)(1),
(2) Date: Jul. 16, 2014

(87) PCT Pub. No.: WO2013/107741
PCT Pub. Date: Jul. 25, 2013

(65) Prior Publication Data
US 2015/0007601 A1    Jan. 8, 2015

(30) Foreign Application Priority Data

Jan. 16, 2012    (FR) ..................................... 12 50390

(51) Int. Cl.
| | |
|---|---|
| F25D 23/12 | (2006.01) |
| F24F 5/00 | (2006.01) |
| F24F 1/00 | (2011.01) |

(52) U.S. Cl.
CPC ........... F24F 5/0035 (2013.01); F24F 5/0003 (2013.01); F24F 5/0046 (2013.01);
(Continued)

(58) Field of Classification Search
CPC .......... F24F 5/0035; F24F 2001/0088; Y02B 30/545

USPC ........................................ 62/259.4, 189, 498
See application file for complete search history.

(56) References Cited

U.S. PATENT DOCUMENTS

| | | | |
|---|---|---|---|
| 4,517,958 A | 5/1985 | Worf | |
| 2008/0060368 A1* | 3/2008 | Campbell | ............... F25B 23/00 62/149 |

(Continued)

FOREIGN PATENT DOCUMENTS

| | | |
|---|---|---|
| DE | 30 21 464 | 12/1981 |
| EP | 0 041 658 | 12/1981 |

(Continued)

OTHER PUBLICATIONS

International Search Report Issued Apr. 23, 2013 in PCT/EP13/050674 Filed Jan. 15, 2013.

(Continued)

*Primary Examiner* — Melvin Jones
(74) *Attorney, Agent, or Firm* — Oblon, McClelland, Maier & Neustadt, L.L.P.

(57) ABSTRACT

Building cooling system involving circulation of a cooling liquid in a hydraulic circuit comprising at least one first tank (2), at least one second tank (4) in which at least part of one of its walls (4.1) are made of a porous material and at least one heat exchanger (6) connected in series through a hydraulic circuit, at least one hydraulic pump (8) placed between the first tank (2) and the heat exchanger (6), in which the second tank (4) is located outside the building, in which in which the system comprises means (10) of controlling circulation of liquid from the second tank (4) to the first tank (2), and when the system is in operation to cool the inside of the building, flow from the second tank (4) to the first tank (2) is interrupted and the hydraulic pump (8) circulates the liquid from the first tank (2) to the second tank through the heat exchanger (6), such that the second tank fills up.

20 Claims, 2 Drawing Sheets

(52) U.S. Cl.
CPC ...... *F24F5/0092* (2013.01); *F24F 2001/0092* (2013.01); *F24F 2005/0025* (2013.01); *F24F 2005/0032* (2013.01); *F24F 2005/0057* (2013.01); *Y02B 10/20* (2013.01); *Y02B 10/24* (2013.01); *Y02B 10/40* (2013.01); *Y02B 30/545* (2013.01)

(56) References Cited

U.S. PATENT DOCUMENTS

| | | | |
|---|---|---|---|
| 2009/0090488 A1* | 4/2009 | McCann | F24F 5/0035 165/104.31 |
| 2010/0003545 A1* | 1/2010 | Horne | B60L 11/1824 429/471 |
| 2011/0151182 A1 | 6/2011 | Tsunemori et al. | |
| 2011/0223450 A1* | 9/2011 | Horne | B60L 11/1824 429/72 |

FOREIGN PATENT DOCUMENTS

| | | |
|---|---|---|
| EP | 1 505 355 | 2/2005 |
| FR | 2 697 324 | 4/1994 |

OTHER PUBLICATIONS

Preliminary Search Report issued Oct. 10, 2012 in French Patent Application No. 1250390 (with English Translation).

Louis Stephan, "A novel Hybrid Indirect Regenerative Cooling System for Low Energy Buildings", LOCIE, CNRS FRE 3220, Universite de Savoié, Preprint submitted to Energy and Buildings, (Apr. 27, 2011), 16 pages.

* cited by examiner

COOLING SYSTEM FOR A BUILDING WITH LOW ENERGY CONSUMPTION

TECHNICAL FIELD AND PRIOR ART

This invention relates to an enhanced cooling system for a building with low energy consumption.

In the design and construction of buildings for homes or professional use, an attempt is made to reduce their energy consumption necessary for heating and cooling. This is done by improving the thermal insulation from the exterior to limit outwards heat losses during the winter and inwards heat penetration during the summer.

Air conditioning systems are used to cool the building. Most existing air conditioning systems are mechanical systems that use large quantities of electricity, and therefore an attempt is made to replace them by much more economic systems called "passive cooling systems".

These passive cooling systems use different heat exchange mechanisms, namely cooling by evaporation, cooling by radiation and convective cooling.

For example, cooling by evaporation consists of cooling air by contact with water that evaporates. Cooling by radiation uses the sky as heat exchanger, since the temperature of the sky is usually lower at night than in buildings. Finally, convective cooling systems use cool air for example available either at night or in the basement through heat exchangers.

There are several systems that are still in the prototype state, which cool a building by recovering rainwater by getting it to circulate in the building.

A first example of such systems uses a reservoir to collect rainwater, this rainwater is then circulated in a closed circuit located inside the building, for example in ceilings to cool air inside the building. Water circulates from the tank inside the building, and is then returned to the tank. Water is circulated as long as cooling is required. Water is heated as it circulates in the building, and therefore has to be cooled to keep its temperature sufficiently low to effectively cool the air in the building during the day. This is done by providing a circuit between the storage tank and the roof, water is circulated in the roof at night and is cooled by radiative and convective effects.

This cooling system is very efficient, however, it does not use cooling by evaporation because the system is closed.

There is another cooling device that uses rainwater stored in a tank. This rainwater is circulated inside the building. Water is also cooled at night, however this system is different from the system described above in that water is cooled by sprinkling water on the surface of the roof, water is then cooled by radiative and convective exchanges and by evaporation. Water is subsequently recovered in gutters and returned into the storage tank.

These two devices have the important disadvantage that they require high maintenance with high cost. In the case of the system in which the water is sprayed on the roof surface, the roof must be kept clean and the sprinklers must be cleaned regularly. Furthermore, the quantity of cooling energy that can be potentially recovered in these systems is directly related to the roof area available for the building, which means that this type of device is relatively effective for houses with a single upstairs floor, but for example is much less efficient for buildings for which the roof area is very small compared with the number of floors and the volume to be cooled.

Furthermore, these devices require water circulation at night and water circulation during the day inside the building by means of a pump, which requires significant consumption of electricity. Furthermore, operation of the pump during the night may form a noise nuisance and its service life is reduced.

PRESENTATION OF THE INVENTION

Consequently, one purpose of this invention is to provide a passive cooling system for a building that has high cooling efficiency and low maintenance costs, suitable for houses and for buildings.

The purpose mentioned above is achieved using a cooling system with at least one first tank, at least one second tank, at least one heat exchanger located inside the building and between the first and the second tank. The first tank, the second tank and the heat exchanger are connected in series and a pump is placed between the first tank and the heat exchanger so as to circulate a cooling liquid from the first tank to the second tank through the heat exchanger and a means of closing off the flow inside the circuit on the downstream side of the second tank so as to fill the second tank from the first tank during operation of the pump. The second tank has a porous part so that the cooling liquid can also be cooled by evaporation.

The second tank will be located outside the building and cools the cooling liquid during the night, at least by radiation and convection.

Preferably, the second tank is placed on a facade of the building that receives no solar radiation, to prevent heating of the cooling liquid during the day.

When the cooling liquid has been sufficiently cooled during the night, it is returned to the first tank by gravity.

Advantageously, the second tank is located at a higher elevation than the first tank such that when flow between the second and the first tank is allowed, it takes place by gravity without requiring a pump. Thus, energy consumption is low and noise nuisance due to operation of a pump is eliminated.

Furthermore, the pump is only used for circulation of the liquid during the day, therefore its service life is longer.

In other words, the cooling system circulates cooling liquid during the day between the first and the second tank through the heat exchanger, and cooling liquid returns into the first tank only after it has been cooled in the second tank.

This system requires low maintenance because there is no need to clean the roof or the filters, and the porous tank does not require any particular maintenance.

The subject-matter of this invention is then a building cooling system involving circulation of a cooling liquid in a hydraulic circuit comprising at least one first tank, at least one second tank in which at least part of one of its walls is made of a porous material, and at least one heat exchanger connected in series through a hydraulic circuit, at least one hydraulic pump placed between the first tank and the heat exchanger, the second tank being configured to be located outside the building. The system comprises means of controlling circulation of liquid from the second tank to the first tank, and when the system is in operation to cool the inside of the building, flow from the second tank to the first tank is interrupted and the hydraulic pump circulates the liquid from the first tank to the second tank through the heat exchanger such that the second tank fills up.

The porosity of the porous material is advantageously between 10% and 35%.

For example, the porous material is a baked clay or porous ceramic.

The second tank very advantageously comprises at least one textured outside face so as to have a large heat exchange area.

The textured outside face is preferably a face of the porous part.

The second tank is preferably designed to be fixed on an outside facade of the building.

The second tank may comprise a second wall parallel to the first wall, said second wall being impervious to liquid, for example made of galvanised steel or plastic.

Preferably, the cooling system comprises means of bypassing the second tank so that the liquid from the heat exchanger drains to the first tank when the second tank is completely filled.

The first tank can be buried, for example located inside a crawl space.

The first tank advantageously comprises an upper face which is at least partially open to enable heat exchange by evaporation between the liquid that it contains and the outside environment.

The system may comprise at least two second tanks, the two second tanks being connected to each other.

Another subject-matter of the invention is a building comprising one or several levels and a cooling system according to this invention, the second tank being fixed on an external facade.

Said external facade is preferably a facade not exposed to solar radiation.

The first tank comprises an open upper face, with an area that is advantageously more than 5% of the floor area of the building.

The building may comprise one heat exchanger at each level.

Advantageously, the elevation of the second tank is higher than the elevation of the first tank, such that flow can take place from the second tank to the first tank by gravity.

Another subject-matter of this invention is a method of cooling a building by circulating a cooling liquid in a hydraulic circuit comprising at least one first tank, at least one second tank and at least one heat exchanger, connected in series through a hydraulic circuit, at least one hydraulic pump placed between the first tank and the heat exchanger, in which the second tank will be located outside the building, in which the system comprises means of controlling circulation of the liquid from the second tank to the first tank, said method comprising the following steps:

a) interruption of the flow of cooling liquid from the second tank to the first tank, b) start the hydraulic pump to circulate the cooling liquid through the heat exchanger from the first tank into the second tank, as long as the inside of the building needs to be cooled, c) stop the hydraulic pump, d) allow the cooling liquid to flow from the second tank to the first tank.

Step d) preferably takes place when the temperature of the cooling liquid is less than or equal to a given threshold, and not later than at the end of the night.

BRIEF DESCRIPTION OF THE DRAWINGS

This invention will be better understood after reading the following description and the appended drawings in which.

DETAILED PRESENTATION OF PARTICULAR EMBODIMENTS

Figure 1:
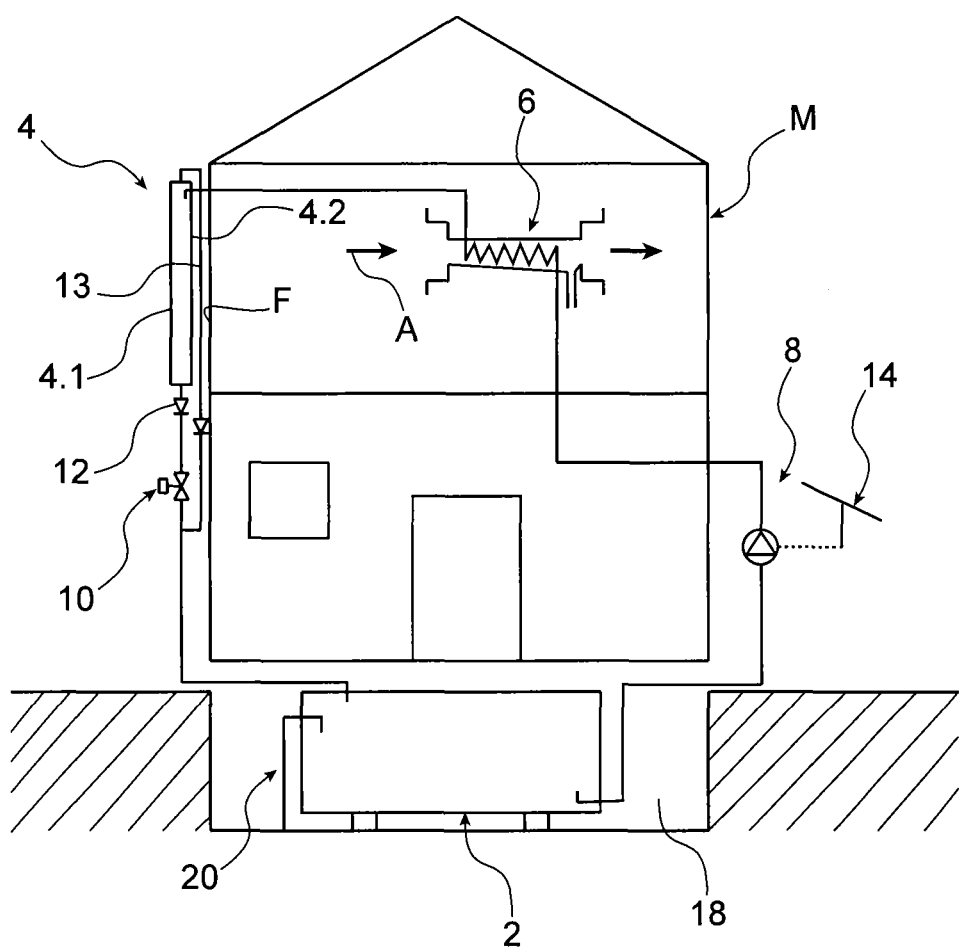
FIG. 1 shows a diagrammatic view of an example embodiment of a cooling system according to this invention applied to a building with a single upstairs floor.
Figure 2:
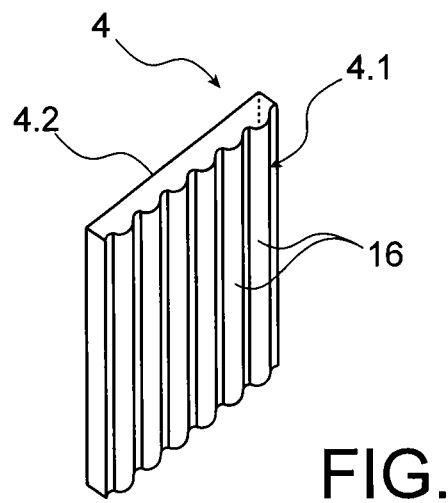
FIG. 2 is a diagrammatic perspective view of an example embodiment of a second tank used in the cooling system in FIG. 1.

FIG. 1 shows a diagrammatic view of a building M in which a cooling system according to one example embodiment of this invention is installed.

The building to which the cooling system according to the invention is applied is a detached house with one upstairs floor, in other words a house with two levels, but it should be noted that the cooling system according to the invention may be applied to any type of building, for example buildings with several floors.

The cooling system comprises a first tank 2 which is preferably buried, a second tank 4 located outside the building, a heat exchanger 6 that will cool air inside the building and a hydraulic pump 8 located between the first tank 2 and the heat exchanger 6.

The first tank 2, the hydraulic pump 8, the heat exchanger 6 and the second tank 4 are connected in series by means of a circuit in which the cooling liquid will be circulated.

Furthermore, the circuit comprises means 10 of interrupting the circulation of liquid from the second tank 4 to the first tank 2. For example, these means 10 are formed by a solenoid valve controlled by a central unit. Manual control means may be used to interrupt circulation of liquid from the second tank to the first tank 4.

Advantageously, a non-return valve 12 is provided downstream from the second tank 4. Also advantageously, a bypass 13 is provided between the second tank 4 and part of the circuit downstream from the solenoid 10 in case the second tank 4 overflows, as will be described below.

As shown in FIG. 1 and advantageously, the hydraulic pump 8 is powered by at least one photovoltaic panel 14. As we will see in the remainder of the description of operation of the cooling system, this pump 8 is only designed to operate during the day and therefore during sunny periods. Operation of the pump may be independent due to the photovoltaic panel.

In the example shown, the second tank 4 is fixed to a facade F of the building M.

In the example shown and advantageously, the second tank 4 is located at a higher elevation than the first tank 2, which allows gravity flow from the second tank 4 to the first tank 2, avoiding the use of an additional pump. The cost of the installation and its electricity consumption are low. However, a cooling system comprising a pump to transfer liquid from the second tank 4 to the first tank 2 is not outside the scope of this invention.

Very advantageously, the second tank 4 is fixed onto a facade not exposed to solar radiation. This will be the facade facing north in the case of a building located in the Northern hemisphere, and it will be a facade facing south in the case of a building located in the Southern hemisphere. Apart from the fact that the second tank is not exposed to solar radiation and the water contained in it is not heated, the facade used is a facade that usually has few openings. Therefore the system is not bothersome for the inhabitants.

However, this invention is not limited to placement of the tank on a north or south facade depending on the hemisphere, but it is also preferably applicable to any facade for which there is no solar radiation.

Preferably, the second tank 4 has a large heat exchange area. For example and as shown, it may be in the form of a long, wide and narrow rectangular parallelepiped, which facilitates integration on the facade. The second tank shown comprises a first wall 4.1 with the largest area facing outwards and a second wall 4.2 with the largest area parallel to the first wall 4.1 facing the facade.

Furthermore, the second tank 4 comprises a wall made at least partly from a porous material allowing heat exchange by evaporation. In the example shown and advantageously, the first wall 4.1 is completely porous and faces outwards from the building. It could be envisaged that only part of the wall is porous.

For example, this first wall 4.1 may be made of baked clay made by casting or pouring. If it is made by pouring, a deflocculant is added to the paste and water mix to form a liquid that will be poured into the corrugated mould. In another example embodiment, the porous face is made from a porous ceramic, for example porous ceramic construction bricks based on silica or alumina, etc.

Preferably, the porosity of the porous material used for the second tank is between 10% and 35%.

Preferably, the second wall 4.2 of the second tank facing the facade of the building is made from an impervious material, for example galvanised steel or plastic preventing the formation of humidity on the side of the house facade.

Furthermore and preferably, the outside surface of the second tank is at least partly textured so as to increase its heat exchange area with the outside environment. In the example shown, the entire height of the surface of the first porous wall 4.1 comprises corrugations 16. For example, the formation of such corrugations with a diameter equal to 5 cm in a flat plate with an area of 1 $m^2$ provides a heat exchange area equal to 1.57 $m^2$. The outside face of the second wall 4.1 and/or the faces of the sidewalls could also be textured. Any other form of structure that would increase the heat exchange area could be envisaged.

The first tank is preferably buried so as to limit variations of the temperature in the environment surrounding it and therefore to be able to limit natural heating of the cooling liquid contained in it. In the example shown, it is located in the crawl space 18 of the house, which reduces its footprint. However, it could be placed outside the house, for example in the garden.

Figure 3:
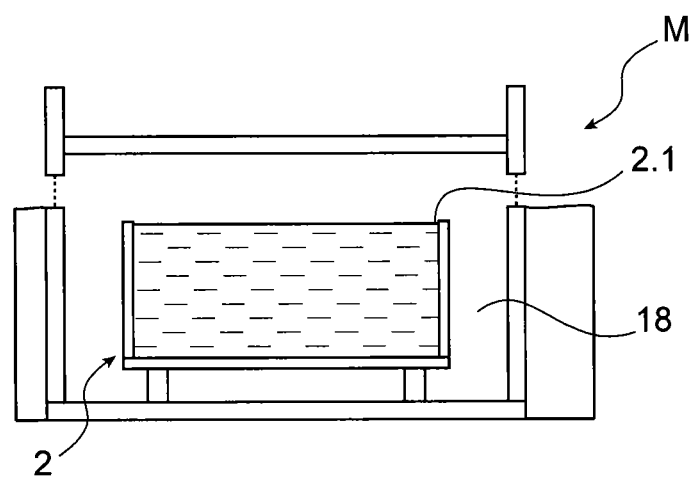
FIG. 3 is a diagrammatic front view of an example embodiment of the first tank that can be used in the cooling system in FIG. 1.

The first tank 2 may be closed or as shown in FIG. 1 and FIG. 3, it may comprise an open upper surface 2.1 allowing heat exchange by evaporation, increasing cooling of the cooling liquid contained in it. The choice between a first closed tank and a first open tank depends partly on climatic conditions at the location on which the building is installed. For example, a first closed tank may be sufficient if the temperature drops sufficiently at night, and cooling by evaporation will not be required. External constraints, for example such as the lack of space, could guide the choice to a first closed tank.

The cooling liquid is preferably water, and even more preferably rainwater that was collected previously, for example by gutters around the roof of the building.

Advantageously, an additional supply 20 to the first tank may be provided through the town water network, in order to top up the level of the first tank when necessary. The cooling system is intended to operate during the summer at a period during which precipitation is low, and since the device operates in a partially open manner, the water level in the first tank drops. Preferably, the first tank is provided with a level detector. Advantageously, this detector is connected to a water network connection valve that is opened automatically when a drop in the water level is detected.

If rainwater can be recovered, the level will be topped up from this rainwater, but if there is no rainwater, the water level in the first tank is topped up from the town water network.

Preferably, an overflow or bypass device is provided in case of heavy rain.

We will now describe operation of the cooling system according to this invention.

We will consider an initial state that usually corresponds to the state of the cooling system in the morning when the first tank 2 is full of cooling liquid, and the second tank 4 is empty after the morning drainage, as we will explain later on.

Throughout the remainder of the description given below, we will assume that the second tank 4 comprises a porous wall 4.1 for exchange by evaporation. The solenoid valve 10 will also be closed.

When it is detected that cooling is required inside the building, the hydraulic pump 8 is started, and water contained in the first tank 2 is drawn in towards the heat exchanger 6. Therefore air, symbolically represented by the arrow A, that circulates through the heat exchanger 6 is cooled by water circulating through the heat exchanger. Water output from the heat exchanger 6 is transferred into the second tank 4. The solenoid valve 10 at the output from the second tank 4 is then closed, water accumulates in the second tank 4 that fills up. This circulation of liquid from the first tank 2 to the second tank 4 through the heat exchanger 6 continues for as long as cooling is required.

If it is found that the second tank is full while the pump continues to operate and therefore to circulate liquid to the second tank, the overflow system will evacuate water directly from the first tank 2 to a downstream portion of the solenoid valve 10, therefore this water will be sent directly to the first tank.

At the end of the day, when the outside temperature drops and there is no longer any need to cool the inside of the building, the hydraulic pump 8 is stopped, thus interrupting the water flow between the first tank 2 and the second tank 4 through the heat exchanger 6.

During the night, water contained in the second tank 4 located outside the building will exchange heat with the external environment. This cooling is done both by convection, radiation and evaporation through the porous wall 4.1 of the second tank 4, which enables efficient cooling.

When the temperature of the water contained in the second tank 4 is sufficiently low, the solenoid valve 10 is opened and the second tank 4 is drained by gravity, filling the first tank 2. If a need to top up the level of the first tank is detected, it will be topped up. Drainage may take place during the night when the temperature is sufficiently low or in the morning, so that the installation is ready to function.

For example, a system could be provided for measuring the temperature of the water contained in the second tank and to allow the second tank to drain when the temperature is less than or equal to a given threshold. As a variant, it could be planned for drainage to take place at fixed time, assuming that the water will have been sufficiently cooled.

The system according to this invention has the advantage that it only requires operation of the pump during the day, because water is returned from the second tank to the first tank by gravity. The result is lower electricity consumption and longer pump life.

The cooling system also uses three physical heat exchange phenomena, namely cooling by convection, by evaporation and by radiation, which provides particularly efficient cooling.

Furthermore, this system does not require any particular maintenance, unlike systems according to the state of the art that require regular cleaning of filters and/or sprinkler systems.

Furthermore, its cooling capacity is independent of the roof area of the building, which makes it particularly applicable to single-family houses and buildings with several floors. It cooling capacity depends on the area of one of the facades, which is then proportional to the number of floors.

Finally, its installation is not very bothersome, because the second tank is preferably placed on a facade in which there are usually few openings.

The heat exchanger may be a heat exchanger cooling air inside a room directly or a heat exchanger advantageously located in the ceiling or otherwise in the floor of the home, particularly if it is already used for heating.

It will be understood that the system may comprise more than one second tank depending on the volume of water circulated between the first tank and the second tank, or the second tanks if the system comprises several second tanks, for example distributed on the building facade.

It will be understood that second tanks may be arranged elsewhere than on the building facade if this is found to be necessary.

Very advantageously, this cooling system may be controlled fully automatically without any human intervention, other than to choose the inside temperature in the building. The first tank is supplied by rainwater and its level is topped up by the water network. The pump is started up under the control of the central unit when necessary depending on the required temperature in the home. The solenoid valve may be controlled as a function of the temperature in the second tank.

We will now give an example embodiment of the cooling system according to this invention.

We will assume a low consumption house with a single upstairs floor (two levels), each level having a rectangular area of 50 m². This house is occupied by three persons.

The cooling system adapted to cooling of this house then comprises two second tanks 4 connected to each other. Each of these tanks comprises a corrugated face, the corrugations of which have an amplitude of 20 cm and exactly the same peak-to-peak distance giving a shape sector equal to 1.

The total width of each of the second tanks is 28 cm, their length is 2.5 m and their height is 2.8 m. Each second tank 4 then has an area of 7 m² covering 11% of the total area of the north facade.

The first tank is located in a crawl space and is made from 2 mm thick galvanised steel plates, of the open type as shown in FIGS. 1 and 3. Its inside width is 2 m and its inside length is 3 m with a height of 0.8 m. Consequently, the free or open area of this tank is 6 m², which is equal to 8% of the total floor area of the crawl space, and equal to 4% of the area of each floor.

Preferably, the free area of the first tank is equal to at least 5% of the floor area of the building.

Two counter-current heat exchangers are used, with one for each floor.

The invention claimed is:

1. Building cooling system involving circulation of a cooling liquid in a hydraulic circuit comprising:

at least one first tank, at least one second tank in which at least part of one of its walls are made of a porous material the at least one second tank being configured to be located outside the building, at least one heat exchanger, in which the at least one heat exchanger, the at least one first tank and the at least one second tank being connected in series through a hydraulic circuit, at least one hydraulic pump placed between the first tank and the heat exchanger, and a control unit of circulation of liquid from the at least one second tank to the at least one first tank, in which, when the system is in operation to cool the inside of the building, flow from the at least one second tank to the at least one first tank is interrupted and the hydraulic pump circulates the liquid from the at least one first tank to the at least one second tank through the heat exchanger, such that the at least one second tank fills up.

2. Cooling system according to claim 1, in which the porosity of the porous material is between 10% and 35%.

3. Cooling system according to claim 1, in which the porous material is a baked clay or porous ceramic.

4. Cooling system according to claim 1, in which the second tank comprises at least one textured outside face so as to have a large heat exchange area.

5. Cooling system according to claim 4, in which the textured outside face is a face of the porous part.

6. Cooling system according to claim 1, in which the second tank is designed to be fixed on an outside facade of the building.

7. Cooling system according to claim 1, in which the second tank comprises a second wall parallel to said one wall, said second wall being impervious to liquid, for example made of galvanised steel or plastic.

8. Cooling system according to claim 1, comprising means of making a hydraulic bypass of the second tank so that the liquid from the heat exchanger drains to the first tank when the second tank is completely filled.

9. Cooling system according to claim 1, in which the first tank is designed to be buried.

10. Cooling system according to claim 1, in which the first tank comprises an upper face which is at least partially open to enable heat exchange by evaporation between the liquid that it contains and the outside environment.

11. Cooling system according to claim 1, comprising at least two second tanks, the two second tanks being connected to each other.

12. Building comprising one or several levels and a cooling system according to claim 1, the second tank being fixed on an external facade.

13. Building according to claim 12, in which said external facade is a facade not exposed to solar radiation.

14. Building according to claim 12, in which the first tank comprises an open upper face with an area that is more than 5% of the floor area of the building.

15. Building according to claim 12, comprising one heat exchanger at each level.

16. Building according to claim 12, in which the elevation of the second tank is higher than the elevation of the first tank such that flow takes place from the second tank to the first tank by gravity.

17. Method of cooling a building by circulating a cooling liquid in a hydraulic circuit, comprising at least one first tank, at least one second tank and at least one heat exchanger connected in series through a hydraulic circuit, at least one hydraulic pump placed between the first tank and the heat exchanger, in which the second tank will be located outside the building, in which the system comprises a control unit of circulation of the liquid from the second tank to the first tank, said method comprising the following steps:
- a) interruption of the flow of cooling liquid from the second tank to the first tank,
- b) start the hydraulic pump to circulate the cooling liquid through the heat exchanger from the first tank into the second tank as long as the inside of the building needs to be cooled,
- c) stop the hydraulic pump,
- d) allow the cooling liquid to flow from the second tank to the first tank.

18. Cooling method according to claim 17, in which step d) takes place when the temperature of the cooling liquid is less than or equal to a given threshold, and not later than at the end of the night.

19. Cooling system according to claim 7, in which the impervious second wall is made of galvanised steel or plastic.

20. Cooling system according to claim 9, in which the at least one first tank is located inside a crawl space.

\* \* \* \* \*